United States Patent [19]

Landwehr

[11] 3,870,080

[45] Mar. 11, 1975

[54] VOLUME AND TEMPERATURE REGULATING FAUCET

[76] Inventor: Hermann H. Landwehr, 9140 Linder, Morton Grove, Ill. 60053

[22] Filed: Jan. 14, 1974

[21] Appl. No.: 432,818

[52] U.S. Cl...... 137/636.4, 137/625.17, 137/614.17
[51] Int. Cl............................................ F16k 11/18
[58] Field of Search....... 137/625.17, 636.4, 614.16, 137/614.17

[56] References Cited
UNITED STATES PATENTS

| | | |
|---|---|---|
| 2,855,011 | 10/1958 | Horne, Jr................... 137/614.16 X |
| 3,202,181 | 8/1965 | West............................ 137/625.17 |
| 3,351,095 | 11/1967 | Harvey et al. .............. 137/636.4 X |

*Primary Examiner*—William R. Cline
*Attorney, Agent, or Firm*—Edward L. Benno

[57] ABSTRACT

A volume and temperature regulating faucet or valve having a single handle which is rotated to regulate the volume and reciprocated to regulate the temperature of water issuing from the faucet. The operating mechanism of the faucet comprises a unitary cartridge which may be inserted in any rotated position in the faucet housing and in any inserted and axial mixing positions will effectively prevent cross flow between the hot and cold water inlets.

12 Claims, 7 Drawing Figures

VOLUME AND TEMPERATURE REGULATING FAUCET

BACKGROUND OF THE INVENTION

As opposed to known single lever or operator water faucets having handles which are rotated to regulate water temperature and reciprocated to control volume, the handle of the faucet of the subject invention is rotated in a conventional manner to control volume and axially moved to regulate temperature of the water.

SUMMARY OF THE INVENTION

It is intended that the valve construction of the subject invention be primarily used in faucets for hot and cold water systems where it is desirable to have a single handle which may be rotated to regulate volume and reciprocated to regulate the temperature of water delivered from the faucet. Conveniently, the handle may be left in any selected temperature position when the faucet is turned off, and the faucet construction will effectively prevent cross flow of water between the hot and cold water systems should either system experience a pressure drop due to water being used at some other location in the systems.

A feature of the invention is that the operating mechanism of the faucet is assembled as a unitary substantially cylindrical cartridge which is simply axially inserted or removed from the faucet housing. When inserting the cartridge in the faucet housing it may be inserted in any rotated position. The constructional details which permit such insertion also provide for easy threaded assembly of the component parts without having to accurately rotationally align the component parts. Advantages of the foregoing feature are the economical manufacture, repair and replacement of the operating mechanism or cartridge and the parts thereof which are subject to wear.

The invention contemplates that the volume regulating section of the cartridge may be constructed in a number of different embodiments.

The primary object of the invention is to provide a simple and efficient valve which is rotated to adjust volume and axially reciprocated to selectively mix fluid flow from multiple inlets and which further is easily and economically manufactured and maintained.

Other objects and features of the invention will be apparent upon a perusal of the following specification and the drawings.

DETAILED DESCRIPTION OF THE PREFERRED EMBODIMENTS

Figure 1:
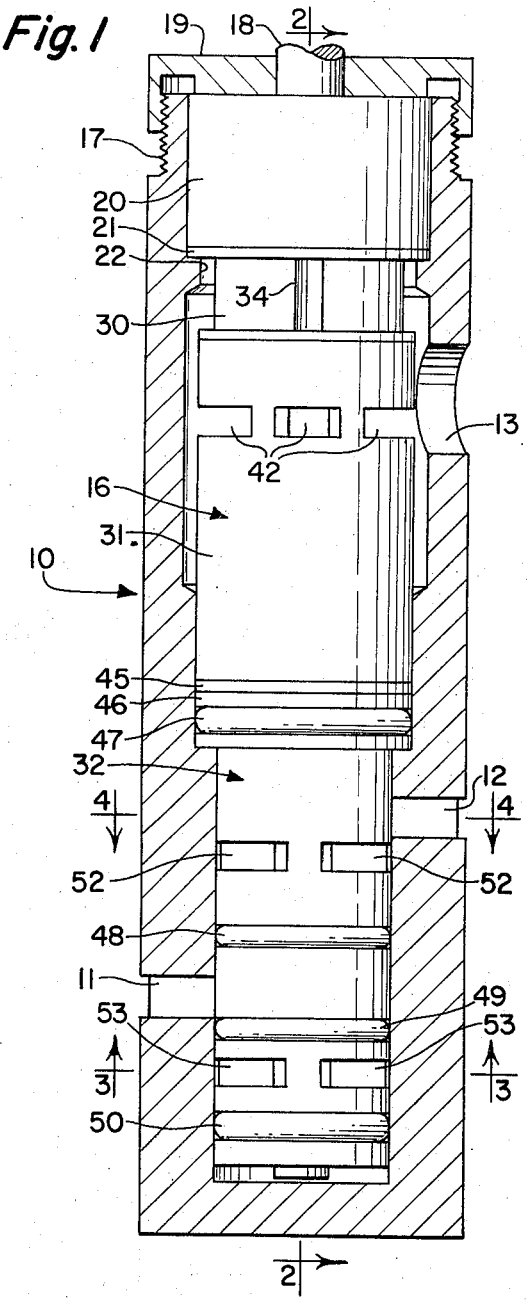
FIG. 1 is a side elevational view of one embodiment of the invention with the valve housing in cross section.
Figure 2:
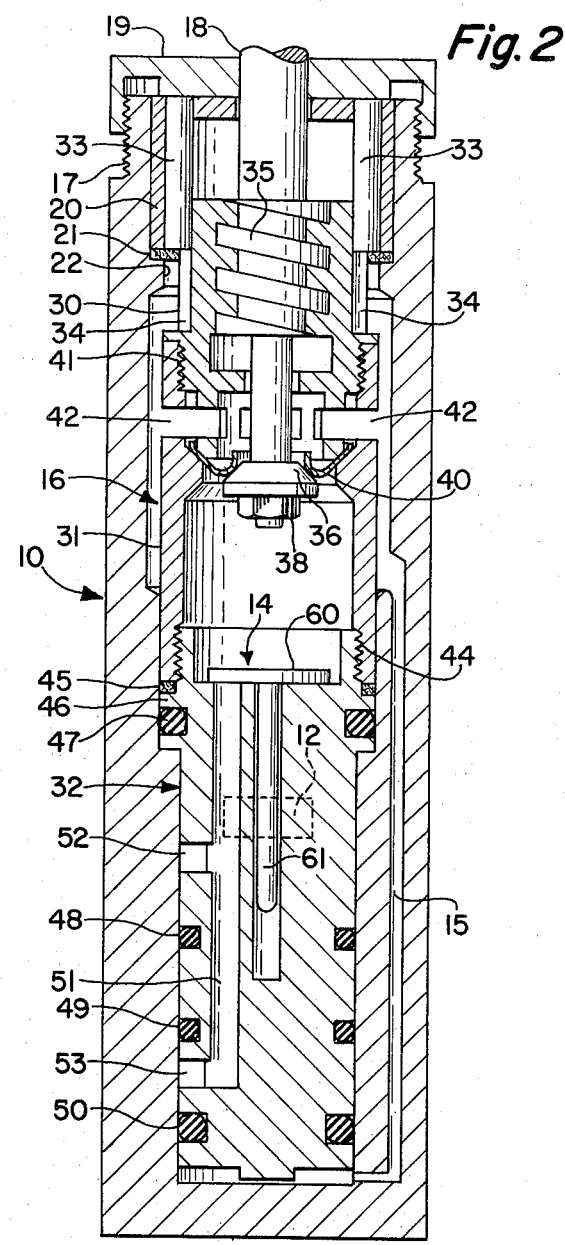
FIG. 2 is a substantially cross sectional view of the structure shown in FIG. 1 and taken substantially along the line 2—2 of FIG. 1.

The external construction of the valve housing 10 is shown substantially diagrammatically in the drawings, and as contemplated for a faucet comprises a hot water inlet 11, a cold water inlet 12, and an outlet 13. Those skilled in the art will understand that the external configuration of the valve housing as a water faucet may take many different forms. In a preferred embodiment, the housing 10 is intended to be arranged in a vertically upright posistion as shown in the drawings so that when the valve is closed gravity will maintain the check valve 14 shown in the center of the valve cartridge in FIG. 2 in the downward or closed position. If the housing 10 is positioned in a horizontal position, a light spring or other resilient member may be provided to bias the check valve 14 toward the closed position.

Although the bottom or lower end of the housing 10 is shown as integral with the side walls, that lower end may be made separately and secured to the side walls, if, for example, such an arrangement will facilitate the forming of the vent line 15 in the side wall of the housing 10.

The housing 10 of a preferred embodiment is provided with a central elongated stepped bore which is circular in transverse section and open at the upper end for insertion and removal of the cartridge 16. If desired the bore need not be stepped if the cartridge 16 is also modified to remove the stepped configuration thereof. The outer upper end of the housing 10 is provided with threads 17 to receive a conventional packing collar 19 to seal the stem 18 and the housing 10 against leakage thereabout and to firmly hold the cartridge 16 within the housing 10 by urging the inverted cup 20 and fiber washer 21 of the cartridge 16 against the annular shoulder 22 of the housing 10. The lower end of the housing 10 is vented to the outlet 13 by the passageway 15 extending therebetween.

The cartridge 16 which is a generally cylindrical unitary assembly comprises in addition to the cup 20, three component assemblies that are threaded or otherwise secured together. Those three component assemblies are an upper volume regulating assembly 30, an intermediate assembly 31, and a lower mixing assembly 32.

The inverted cup 20 slidably receives the upper end of the volume regulating assembly 30 therein. The top wall of the cup 20 is provided with a central opening for passage of the stem 18 therethrough. The cylindrical side wall of the cup 20 fits within a cylindrical bore section of the housing 10, and the lower edge of that side wall rests upon the annular fiber washer 21 which in turn rests upon the annular shoulder 22 within the housing 10. At diametrically opposed positions within the cup 20, a pair of depending fixed rods 33 are provided. Alternatively, the rods 33 may be integrally formed as projections or vertical rails on the inner side wall of the cup 20.

The upper outer side wall of the volume regulating assembly 30 is provided with a pair of diametrically opposed slots or grooves 34 which longitudinally slidably engage the rods 33. The stem 18 is provided with left hand threads 35 by which the stem 18 is threaded into corresponding threads in the upper portion of the assembly 30. When the stem 18 is rotated, by means of a handle (not shown) connected thereto, the stem 18 will be rotated relative to the assembly 30 as the assembly 30 is prevented from rotating by the slots 34 thereof engaging the rods 33. When the stem 18 is moved axially upwardly or downwardly, the assembly 30 and the assemblies 31 and 32 connected thereto are correspondingly moved as the assembly 30 slides on the rods 33.

The lower end of the stem 18 extends below the lower end of the assembly 30 and is provided with an elastic washer 36 secured thereon by nut 38. When the stem 18 is rotated in a clockwise direction, viewed from above, the assembly is moved to the closed position with the washer 36 seated against the valve seat 40. The valve seat 40 has the general shape of one half of a torus and the outer annular portion of the valve seat 40 is firmly secured between the lower end of the assembly 30 and the upper side of an annular shoulder within the intermediate assembly 31. The valve seat 40 is preferably formed from a thin somewhat resilient material to insure good circumferential sealing of the washer 36 on the seat 40. Obviously, when the stem is rotated in a counterclockwise direction, viewed from above, the washer 36 is lowered away from the valve seat 40 to permit water within the central portion of the intermediate assembly 31 to flow upwardly through the open center of the valve seat 40. Immediately above the valve seat 40, the assembly 30 is provided with a hollow portion with radially disposed openings therethrough to pass water from the valve seat 40 outwardly of the assembly 30. Immediately above the hollow portion of the assembly 30, the outer surface of the assembly 30 is provided with threads 41. The threads 41 cooperate with internal threads in the upper end of the intermediate assembly 31 to secure the intermediate assembly to the assembly 30 with the lower portion of the assembly 30 within the assembly 31.

The side wall of the intermediate assembly 31 is provided with a plurality of circumferentially extending and spaced apart openings 42 in substantial radial alignment with the openings in the hollow portion of assembly 30. In all permitted axial positions of the cartridge 16, the openings 42 will pass water from the assembly 30 to the faucet outlet 13. Thus it may be seen that when the stem 18 is rotated to move the washer 36 away from the valve seat 40, water from within the assembly 30 will flow to the outlet 13.

The portion of the assembly 31 below the assembly 30 is hollow and lower internal end of the intermediate assembly 31 is provided with threads 44 which cooperate with threads on the outer upper end of the mixer assembly 32 to secure the mixer assembly 32 thereto. A fiber washer 45 between the lower edge of the intermediate assembly 31 and an annular shoulder 46 on the mixer assembly 32 seals the upper end of the mixer assembly 32 within the lower end of the intermediate assembly 31.

The outer surface of the mixer assembly 32 is provided with four axially spaced apart O-rings 47, 48, 49 and 50 which divide the mixer assembly 32 into three sections. The O-rings 47–50 engage the inner wall of the housing 10 to seal those three sections against the flow of water along the outer surface of the mixer assembly 32 and between those three sections.

The mixer assembly 32 comprises three longitudinally extending passageways 51 which in the preferred embodiment are shaped in transverse section as three arcuate areas or segments which together define a circumferentially discontinuous cylinder. The upper ends of the passageways 51 terminate in the upper surface of the mixer assembly 32 and the lower ends thereof terminate at an axial position between the O-rings 49 and 50. Each passageway 51 is connected to two axially spaced apart radial passageways 52 and 53. In the preferred embodiment the radial passageways 52 and 53 are provided with side walls which are generally radial extensions of the side walls of the passageways 51 as may be seen in FIG. 3. The upper and lower walls of the passageways 52 and 53 lie in spaced apart flat planes perpendicular to the longitudinal axis of the mixer assembly 32. The passageways 52 lie in a common plane between O-rings 47 and 48. The passageways 53 lie in a common plane between O-rings 49 and 50.

Figures 3, 4:
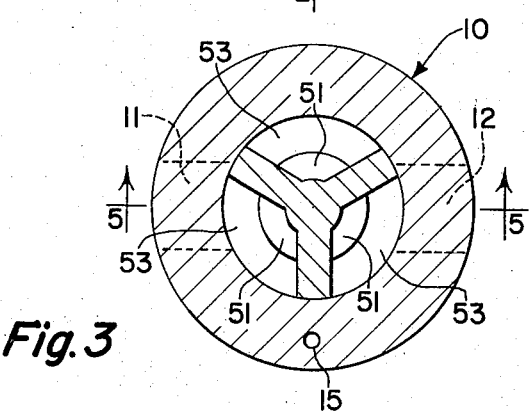
FIG. 3 is a substantially transverse cross sectional view taken substantially along the line 3—3 of FIG. 1.
FIG. 4 is a substantially transverse cross sectional view taken substantially along the line 4—4 of FIG. 1 but showing the cartridge in a different rotated position.

The hot water inlet 11 and the cold water inlet 12 are formed through the side wall of the housing 10 at diametrically opposite and axially spaced apart positions. The heights and widths of the inlets 11 and 12 at the inner surface of the housing 10 are substantially the same, and the widths are further such, relative to the widths of passageways 52 and 53, that every rotated position of the mixer assembly 32 in the housing 10 avoids the connection of the inlets 11 and 12 into any passageways 52 and 53 which are common to one of the passageways 51. Each inlet 11 and 12 may be connected into a single passageway 51 as shown in FIG. 3, or one of the inlets 11 or 12 may be connected into two passageways 51 as inlet 12 in FIG. 4 which shows a different rotated position of the cartridge 16 in initial insertion in the housing 10. The invention contemplates that more passageways 51 and associated passageways 52 and 53 may be provided, but the minimum number is three as shown to prevent direct cross connection of the inlets 11 and 12.

Figure 5:
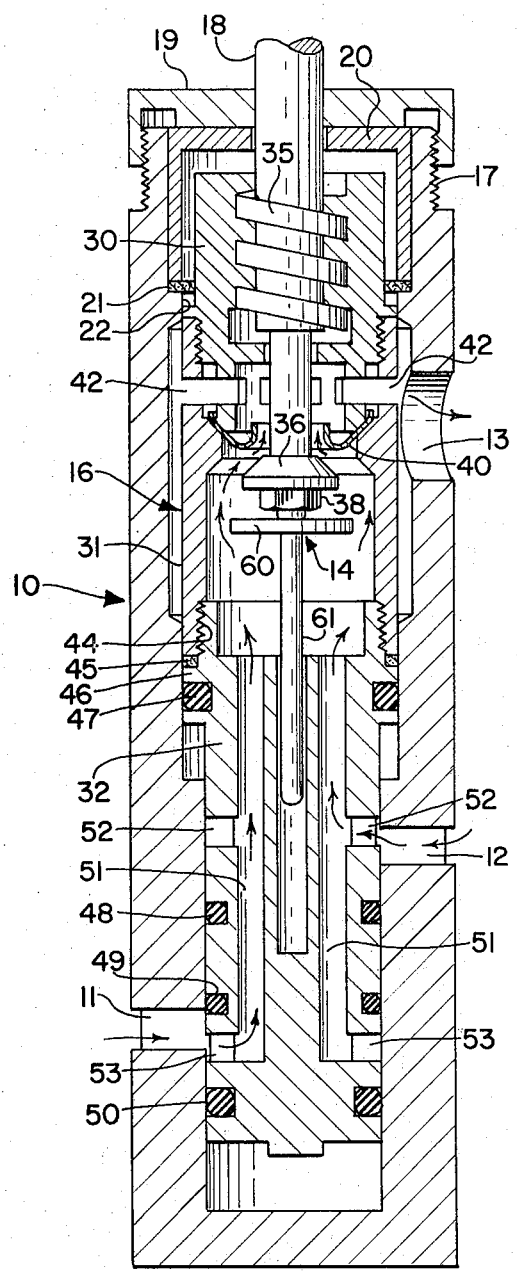
FIG. 5 is a view similar to FIG. 1 but with the cartridge in substantial cross section and in a partially axially upwardly moved position.

The inlets 11 and 12 are further relatively axially positioned in the housing 10, and the passageways 52 and 53 are relatively axially posistioned in the mixing assembly 32 and relatively to the inlets 11 and 12, so that when the cartridge 16 is in its lowest position, the passageways 53 are below inlet 11 and passageways 52 are below inlet 12. In that position O-rings 48 and 49 are respectively above and below inlet 11, and O-rings 47 and 48 are respectively above and below inlet 12. As the cartridge 16 is moved initially upwardly from its lowermost position, one or two passageways 52 will be connected to cold water inlet 12 while hot water inlet 11 will remain blocked. Further upward movement of the cartridge 16 will bring one or two passageways 53 into connection with hot water inlet 1 and with passageways 52 remaining connected to cold water inlet 12 as shown in FIG. 5. Thus it may be seen that in the range wherein the cold and hot water inlets 12 and 11, respectively, are connected to passageways 52 and 53 varied proportions of cold and hot water are delivered to appropriate passageways 51 to issue from the upper end of mixer assembly 32 and to be mixed within intermediate assembly 31. As the cartridge 16 is moved further upwardly, the passageways 52 will be blocked from the cold water inlet 12, and one or two passageways 53 will be full open to hot water inlet 11. If desired the passageways 52 may be increased in height or moved upwardly of the assembly 32 to provide some fluid connection of the passageways 52 to inlet 12 when the cartridge 16 is in the lowermost position to provide some cold water flow when the faucet is opened with the cartridge 16 in the lowermost position.

The mixer assembly 32 of the first embodiment further includes check valve 14 which comprises a sealing disk 60 and a shaft or pin 61. The pin 61 is loosely journaled in an axial hole extending from the upper surface of mixer assembly 32 to a closed lower end within the mixer assembly 32. The sealing disk 60 has a diameter sufficient to cover and seal the upper ends of the passageways 51. When the volume regulating valve in assembly 30 is closed, water pressure within intermediate section 31 and within passageways 51 will be the same and gravity will cause check valve 14 to close with disk 60 over the upper ends of the passageways 51. If the cartridge 16 is in any axial mixing position where the hot and cold water inlets are open to the passageways 51, a pressure drop at one of the inlets will not cause water from the other inlet to enter the one inlet because the pressure drop will hold the disk 60 seated in water sealing relationship. When the volume regulating valve is open as shown in FIG. 5, the water flowing from the upper ends of the passageways 51 will raise the check valve 14 to an open position such as shown in FIG. 5. In other embodiments of the invention where the faucet is mounted in a horizontal position, arrangements other than the use of gravity may be provided for closing the check valve 14 or its equivalent when a pressure drop occurs in one of the passageways 51.

Figure 6:
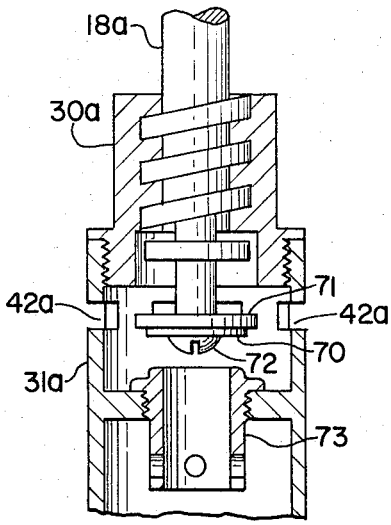
FIG. 6 is a substantially cross sectional view of another embodiment of the volume regulating section of the cartridge.

The subject invention further contemplates that other volume regulating valves may be used in place of the volume regulating valve shown and described in regard to FIGS. 1-5. FIG. 6 shows another form of volume regulating valve and for that valve, the upper and intermediate assemblies 30 and 31 and stem 18 of FIG. 5 are slightly modified to upper and intermediate assemblies 30a and 31a, respectively and stem 18a. Upper assembly 30a is provided with an internal right hand thread to cooperate with a corresponding right hand thread fromed on the stem 18a. Thus when stem 18a is rotated in a clockwise direction, viewed from above, the stem 18a is lowered. The lower end of the stem 18a is provided with a rigid supporting washer 71 and a flat elastic sealing washer 70 secured against the underside of washer 71 by a screw 72. The valve seat for the sealing washer 70 comprises a cylindrical member 73 which is threaded into an internal annular shoulder in the intermediate assembly 31a. The intermediate assembly 31a differs from intermediate assembly 31 in the formation of the internal threaded annular shoulder in place of the tapered shoulder that supports the valve seat 40 in assembly 31. The lower end of the valve seat 73 is provided with openings in the side wall to pass water therethrough when the check valve 14 is in the upper position shown in FIG. 5. When the stem 18a is rotated to project the sealing washer 70 against the top of the valve seat 73 water in the central portion of intermediate section 31a is blocked from passage through valve seat 73, openings 42a, and outlet 13. The stem 18a is further provided with an annular shoulder to limit the upward opening movement of the volume regulating assembly of the faucet.

Figure 7:
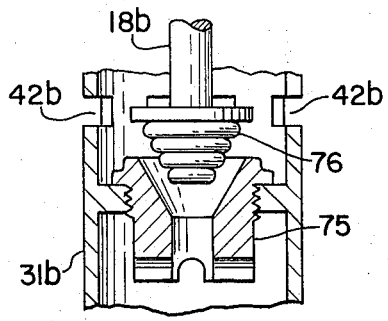
FIG. 7 is a substantially cross-sectional view of a further embodiment of the volume regulating section.

The further contemplated embodiment of the volume regulating assembly shown in FIG. 7 is intended to be used with a valve stem and upper assembly having right hand threads such as described in regard to FIG. 6. In other words, when valve stem 18b is rotated in a clockwise direction viewed from above it is lowered toward the valve seat 75. The lower end of the valve stem 18b is provided with a generally frusto-conical elastic sealing member or washer 76. The external shape of the member 76 is that of a stacked series of toroidal sections successively reduced in diameter. The member 76 may be molded as a one piece member or may be made up of a number of O-rings successively smaller in diameter. It is further contemplated that some of the intermediate toroidal sections may be omitted. However, it is intended that member 76 may be generally frusto-conical to provide a greater number of sealing surfaces than is provided by the sealing arrangements shown and described relative to the other embodiments. Thus if one toroidal section of member 76 is worn or otherwise ineffective to seat in a sealing arrangement against the valve seat 75, other one or more of the toroidal sections will be effective to close the valve. The member 76 may be integrally molded upon the stem 18b or may be secured thereon with a screw such as screw 72 of FIG. 6. The valve seat 75 has a frusto-conical sealing surface for sealing cooperation with the member 76, and circumferentially disposed slots in the lower end thereof for free passage of water through the valve seat when the check valve 14 is in its uppermost position. The intermediate assembly 31b is similar to assembly 31a of FIG. 6 and the upper portion thereof is provided with water outlet openings 42b for passage of water from the upper portion of the intermediate section 31b to the outlet 13 of the faucet.

Because the embodiments of FIGS. 6 and 7 contemplate a movement of the stem toward the mixing assembly 32 in the faucet closing operation, an extension may be provided on the stem to extend through the valve seat into cooperation with the disk 60 of the check valve 14 to effectively close the check valve 14, or its equivalent, when the stem has been rotated to close the volume regulating valve.

Having described the invention it is to be understood that changes can be made in the described embodiments by one skilled in the art within the spirit and scope of the invention as defined in the claims.

I claim:

1. A volume regulating and mixing faucet for hot and cold water lines, comprising a faucet housing having an elongated bore substantially circular in transverse section, a hot water inlet, a cold water inlet, an outlet, said inlets and outlet opening into said bore at longitudinally spaced apart positions, a unitary cartridge having an outer surface generally conforming to the inner surface of said bore and mounted in said bore in cooperation with said inlets and outlet, said cartridge including an internal chamber, a stem for operating said faucet, means mounting said stem in said cartridge for rotation of said stem relative to said cartridge and for axial movements of said cartridge in said bore responsive to axial movements of said stem, first means in said cartridge responsive to certain axial movements of said cartridge in said bore for receiving and directing certain varied amounts of water from said inlets to said internal chamber, and second means in said cartridge responsive to certain rotations of said stem relative to said cartridge for receiving and directing certain varied amounts of water from said internal chamber to said outlet.

2. A volume regulating and mixing faucet as defined in claim 1, and means on one end of said cartridge cooperating with said housing to permit said cartridge to be mounted in any rotated position relative to said bore and to prevent said cartridge from rotating relative to said bore responsive to rotations of said stem.

3. A volume regulating and mixing faucet as defined in claim 2, wherein said last mentioned means comprises a generally cylindrical member mounted concentrically about said one end of said cartridge and within said bore, a pair of diametrically opposed slots in the surface of said one end of said cartridge and extending in axial directions of said cartridge, a pair of projections relatively fixed within said cylindrical member and disposed within said slots to prevent said cartridge from rotating relative to said cylindrical member while permitting axial movement of said cartridge relative to said cylindrical member, and means for fixedly securing said cylindrical member in any rotated position relative to said bore.

4. A volume regulating and mixing faucet as defined in claim 2, said first means in said cartridge including a plurality of radial and axial passageways, said axial passageways extending from said internal chamber to positions spaced from the other end of said cartridge, pairs of said radial passageways positioned in a spaced apart relationship axially of said cartridge and each pair of said radial passageways extending between one of said axial passageways and the outer surface of said cartridge, each of said radial passageways of each pair of said radial passageways arranged for a varied amount of fluid connection to one of said inlets dependent upon the axial and rotated positions of said cartridge, and said inlets and said axial passageways further arranged to avoid any fluid connection of one of said pairs of radial passageways to both of said inlets in any rotated position of said cartridge in said bore and in any axial position of said cartridge relative to said bore.

5. A volume regulating and mixing faucet as defined in claim 4, a sealing member of a size sufficient to substantially simultaneously cover the openings of said axial passageways in said internal chamber, means carrying said sealing member in said internal chamber in cooperation with said openings of said axial passageways in said internal chamber for substantial sealing of said openings in response to a water pressure drop in one of said axial passageways when said first means in said cartridge is in an operated condition directing water from said inlets to said internal chamber and said second means in said cartridge is in an operated condition blocking the passage of water from said internal chamber to said outlet.

6. A volume regulating and mixing faucet as defined in claim 4, said axial passageways arranged substantially in a circle about the central axis of said cartridge, a check valve, said check valve comprising a sealing member and an integral shaft, said shaft loosely journaled in said cartridge on said central axis and between said axial passageways with said sealing member disposed over the ends of said axial passageways to said internal chamber.

7. A volume regulating and mixing faucet as defined in claim 4, one of said radial passageways of all of said pairs of radial passageways arranged in a common transverse first plane, the other of said radial passageways of all of said pairs of radial passageways arranged in a common transverse second plane axially spaced from said first plane, and said radial passageways of all of said pairs of radial passageways in each of said first and second planes being of a size relative to said inlets to avoid any fluid connection of one of said pairs of radial passageways to both of said inlets in any rotated position of said cartridge in said bore and in any axial position of said cartridge relative to said bore and to provide for fluid connection of at least one of said radial passageways in each of said first and second planes to each of said inlets in any rotated position of said cartridge in said bore when said first and second planes include said inlets.

8. A volume regulating and mixing faucet as defined in claim 7, wherein said pairs of radial passageways are three in number.

9. A volume regulating and mixing faucet as defined in claim 2, said second means in said cartridge including passageway means extending between said internal chamber and the outer surface of said cartridge for directing water from said internal chamber to said outlet in any rotated position of said cartridge relative to said bore, a valve seat in said passageway means, a valve sealing member mounted on said stem and cooperating with said valve seat to vary the amount of water passing from said internal chamber to said outlet responsive to said certain rotations of said stem relative to said cartridge.

10. A volume regulating and mixing faucet as defined in claim 9, wherein said valve seat comprises a substantially annular resilient member, said valve sealing member comprising a substantially frusto-conical elastic member the outer surface of which is arranged to concentrically cooperate with the inner periphery of said annular resilient member to vary the amount of water passing through said annular resilient member dependent upon the spacing between said frusto-conical outer surface and said annular resilient member, and means for axially moving said valve sealing member responsive to rotation of said stem to vary the spacing between said frusto-conical outer surface and said annular resilient member.

11. A volume regulating and mixing faucet as defined in claim 9, wherein said valve seat comprises an annular rigid member the inner periphery of which is shaped to define a substantially frusto-conical surface, said valve sealing member comprising an elastic member having a substantially frusto-conical outer surface and carried on said stem concentrically within said valve seat to vary the amount of water passing through said valve seat dependent upon the spacing between said frusto-conical outer surface of said valve sealing member and said inner periphery of said valve seat, and means for axially moving said valve sealing member responsive to rotation of said stem to vary the spacing between said frusto-conical outer surface of said valve sealing member and said inner periphery of said valve seat.

12. A volume regulating and mixing faucet as defined in claim 11, wherein said substantially frusto-conical outer surface of said elastic member of said valve sealing member comprises a plurality of torus shaped surfaces.

\* \* \* \* \*